United States Patent [19]

Knicely et al.

[11] Patent Number: 4,975,870
[45] Date of Patent: Dec. 4, 1990

[54] APPARATUS FOR LOCKING A PORTION OF A COMPUTER MEMORY

[75] Inventors: Wendell L. Knicely, Framingham; Charles F. Squires, Newtonville, both of Mass.

[73] Assignee: Data General Corporation, Westboro, Mass.

[21] Appl. No.: 160,230

[22] Filed: Feb. 25, 1988

[51] Int. Cl.[5] .................... G06F 12/14; G06F 13/16; G11C 7/00
[52] U.S. Cl. ............................ 364/900; 364/948.31; 364/965.9; 364/969.2; 364/969.3; 365/230.05; 365/195
[58] Field of Search ... 364/200 MS File, 900 MS File; 365/230.05, 195, 228

[56] References Cited

U.S. PATENT DOCUMENTS

| | | | |
|---|---|---|---|
| 4,104,719 | 8/1978 | Chu et al. | 364/200 |
| 4,439,830 | 3/1984 | Chueh | 364/200 |
| 4,443,846 | 4/1984 | Adcock | 364/200 |
| 4,574,350 | 3/1986 | Starr | 364/200 |
| 4,577,292 | 3/1986 | Bernstein | 365/189.07 |
| 4,587,609 | 5/1986 | Boudreau et al. | 364/200 |
| 4,720,780 | 1/1988 | Dolecek | 364/200 |
| 4,827,399 | 5/1989 | Shibayama | 364/200 |

*Primary Examiner*—Gareth D. Shaw
*Assistant Examiner*—Christina M. Eakman

[57] ABSTRACT

An apparatus for incorporation in each memory-using component of a data processing system permits locking of a portion of the memory, which portion may be as small as a single location, for atomic read-modify-write operations while permitting unlimited access to the memory for read operations and access to all but the locked portion for non-atomic write operations.

7 Claims, 1 Drawing Sheet

APPARATUS FOR LOCKING A PORTION OF A COMPUTER MEMORY

BACKGROUND OF THE INVENTION

1. Field of the Invention

This invention relates to digital computer systems, particularly to the memory control portions of digital computer systems, and most particularly to means for selectively locking portions of memories of digital computer systems.

2. Description of the Prior Art

Digital computer systems typically include processing subsystems and memory subsystems, the latter for storing data and sequences of instructions, the former for operating upon the data as directed by a sequence of instructions (such a sequence being known as a "program").

Advances in hardware design have resulted in "multiprocessor" systems and "distributed" systems, wherein a plurality of intelligent entities (CPU's, I/O channels, etc.) may operate simultaneously, often sharing some of the data in memory and cooperatively updating that data. Similarly, advances in software design have culminated in "multiprogram" or "multiprocess" systems, wherein a single intelligent hardware unit may host a plurality of programs, operating independently of each other, all of which may operate simultaneously, possibly sharing and cooperatively updating data.

One of the problems that had to be overcome to realize such configurations was the coordination of data sharing—for example, preventing two or more processes from attempting to update the same data at the same time. A typical scenario in which difficulty might arise might be:

1. A first process reads a location, and calculates based on what it read a new contents for that location, which it intends to store in that location;
2. Before the first process can write those results, a second process reads the same location, and calculates a new contents for that location, which it intends to store;
3. The first process stores the new contents it calculated;
4. The second process stores the new contents it calculated.

The result stored by the second process is probably incorrect, because it is based on obsolete data—data which the second process had no way of knowing was already being updated by the first process.

A solution to this problem has been to define an "atomic" or "indivisible" operation for performing such data modification, in which no intermediate results of the atomic operation are externally visible—when one process is performing such an operation, no other processes can access the data until the operation is completed.

The prior-art implementation of this solution has been to "lock" the entire memory for the duration of an atomic operation, meaning that any request by another process to use the memory had to be held pending until the atomic operation was completed. This has a deleterious effect on the efficiency of the system. A refinement to this basic solution is to lock something less than the entire portion of the memory, usually the physical "block" or "page" containing the location upon which the atomic operation is being performed. Since such a portion is typically several thousand locations or more, this results in pending a significant portion of the other processes contending for memory access and is thus not a complete solution to the problem.

SUMMARY OF THE INVENTION

The present invention overcomes this drawback of the prior art by providing apparatus which enables the locking of any portion of a memory, as small as a single location. An atomic operation by a process will thus have no impact on any other processes save for those occasions when another process wishes to update the very same location(s) as those involved in the atomic operation. System efficiency is thus not significantly degraded by the locking of the memory.

It is thus a general object of the present invention to provide improved efficiency of digital computer systems.

It is a particular object of the present invention to provide memory locking in increments with a granularity as small as a single location.

Other objects and advantages of the present invention will be understood by those of ordinary skill in the art, after referring to the detailed description of the preferred embodiments and the appended drawings wherein:

DETAILED DESCRIPTION

Figure 1:
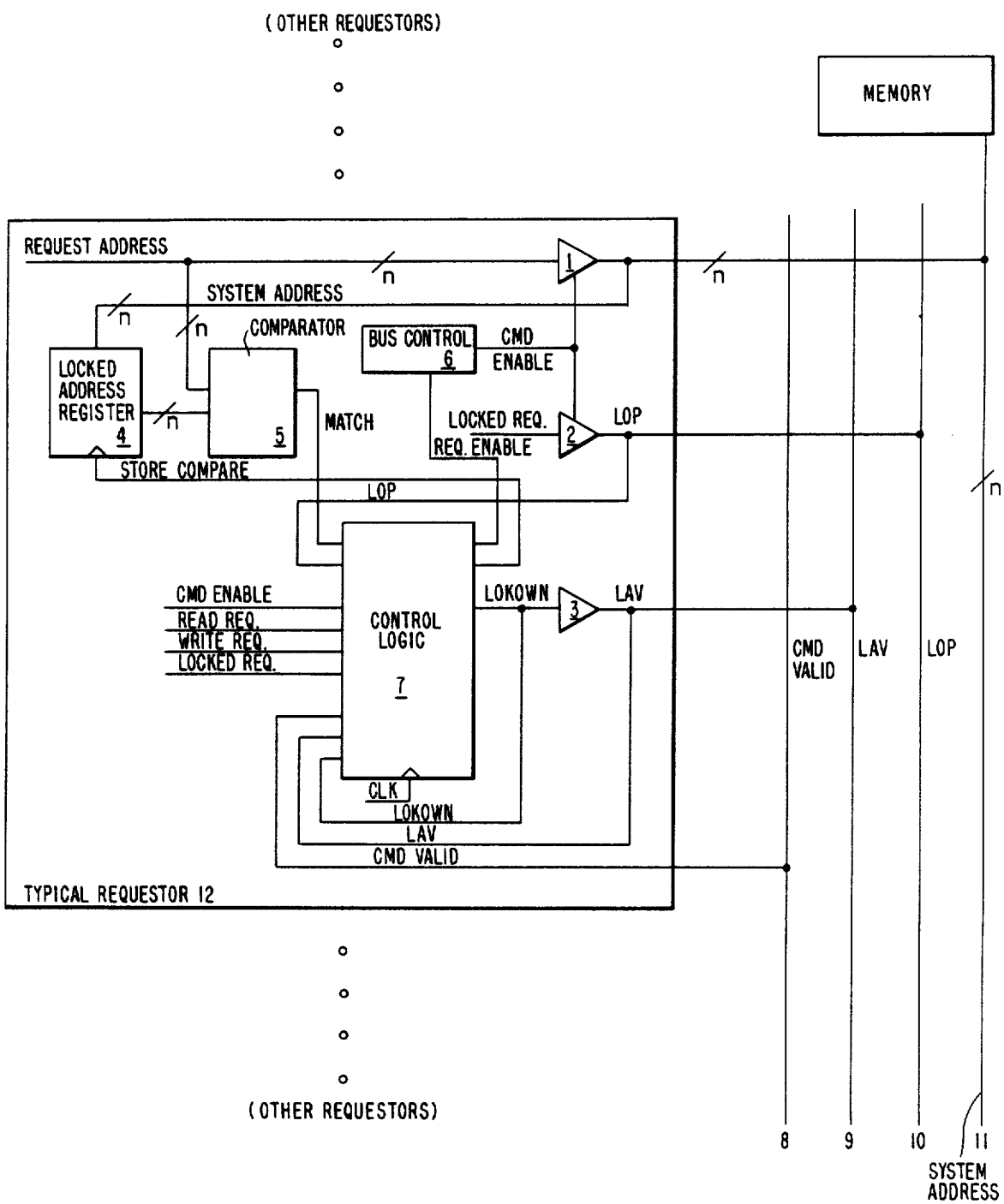
FIG. 1 is a block diagram of the memory locking control circuitry of the present invention.

FIG. 1 is a block diagram of the memory locking control circuitry. Three system-wide control lines are shown at the right: CMDValid (Command Valid) 8; LAV (Locked Address Valid) 9; and LOP (Locked Operation) 10. There is also a system-wide multi-bit System Address Bus 11. All potential requestors of the memory locking service (processors, intelligent I/O channels, etc.) have identical control circuitry connected to the three control lines and the System Address Bus; one such control circuit is depicted in FIG. 1 as Typical Requestor 12.

Typical Requestor 12 is seen to contain drivers 1, 2, and 3; Locked Address Register 4; Comparator 5; Bus Control 6; and Control Logic 7.

Drivers 2 and 3 are seen to drive the LOP and LAV command lines, while driver 1 drives the System Address Bus; those skilled in the art will infer from driver 1's multi-bit input and multi-bit output that it represents a plurality of drivers, one driver for each bit of System Address Bus 11. It is important to note that drivers 1, 2, and 3 are "open collector" drivers: since Typical Requestor 12 is but one of a plurality of such circuits connected to the subject lines, the signal appearing at the output of one of these drivers will either be the signal provided by the driver if it is enabled, or the signal provided by the corresponding driver in another requestor.

FIG. 1 depicts input signals Request Address, READ Req, WRITE Req, and Locked Req. Those skilled in the art will recognize these as typical signals generated within a processor or I/O device for specifying a memory address upon which it is desired to operate, whether that operation is to be a READ or a WRITE operation, and whether that operation is to be a locked operation. All other signals shown within Typical Requestor 12 come from the system lines or are generated within Typical Requestor 12.

Control Logic 7 will be described in terms of its state equations. (Any person skilled in the art can design logic in accordance therewith.) The outputs of Control Logic 7 are seen to be LOKOWN (to Driver 3), STORE Compare (to Locked Address Register 4) and REQ Enable (to Bus Control 6). Control Logic 7 is seen to have a CLK input—the following state equations indicate that the output signals will take on states AFTER the CLK transition as determined by the states of its inputs BEFORE the CLK transition.

| LOKOWN | = | CMDValid * LOP * CMDEnable |
| | + | |
| | | LOKOWN * $\overline{\text{CMDEnable}}$ |
| STORE Compare | = | CMDValid * LOP |
| REQEnable | = | |
| | | READReq * $\overline{\text{LAV}}$ |
| | + | |
| | | READReq * $\overline{\text{LockedReq}}$ |
| | + | READReq * LOKOWN |
| | + | WRITEReq * $\overline{\text{LAV}}$ |
| | + | |
| | | WRITEReq * $\overline{\text{LockedReq}}$ * $\overline{\text{LAV}}$ * $\overline{\text{MATCH}}$ |
| | + | WRITEReg * LOKOWN |

Referring again to FIG. 1, LOKOWN, when asserted, is passed through Driver 3 to assert the system-wide signal LAV (Locked Address Valid); STORE Compare is used to gate the contents out of Locked Address Register 4 to Comparator 5 in order to enable comparison of a locked address with a current Request Address; REQEnable is passed to Bus Control 6, which also monitors bus timing in ways inferrable by those skilled in the art and through paths not depicted in FIG. 1, and which in turn produces CMD Enable at an appropriate time to gate Typical Requestor 12's Request Address through Drivers 1 as the System Address, and Typical Requestor 12's Locked Req signal through Driver 2 as the system-wide LOP (Locked Operation) signal.

In the present embodiment the number "n" bits involved in the address comparisons is the full number of address bits available, resulting in the locking of a single location at a time. It will be evident to those skilled in the art that by using less than the full number of address bits in the comparison (ignoring some number of the lowest order bits), the present scheme can be adapted to lock blocks of any power-of-two size (1 location, 2 locations, 4 locations, 8 locations, etc.).

From FIG. 1 and the foregoing state equations, it will be evident to one skilled in the art of logic design that:

1. Only one locked request at a time may be in progress on the system. (Any requestor performing a locked request will assert LOKOWN, which asserts the system-wide signal LAV, which precludes the generation of REQEnable in any requestor asserting LockedReq.)
2. An unlocked READ request will be honored at any time. (No address comparison is invoked—therefore, an unlocked READ request can even be performed on the very location presently involved in another requestor's locked operation.)
3. An unlocked WRITE request will be honored at any time that there is noncomparison of the Request Address with the locked address (if any). Thus, the only unlocked WRITE requests that must be pended are those which attempt to access the location presently involved in another requestor's locked request.

The invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A digital data processing system including
   a memory having a plurality of storage locations, each storage location having a unique address;
   a plurality of requestors;
   control line means connected to each of the requestors, and system address bus means, connected to the memory and to each of the requestors, each requestor comprising:
   means for requesting an unlocked memory write operation;
   means for requesting a locked memory operation;
   request address bus means;
   means, connected to the locked memory operation requesting means and to the control line means, for generating a signal indicating a locked memory operation is in progress,
   means, connected to the control line means, for receiving the locked memory operation in progress signal from another requestor,
   address storage means;
   means, responsive to the receipt of a locked memory operation in progress signal, for storing the address on the system address bus means in the address storage means,
   means, connected to the address storage means and the request address bus means, for comparing the stored address to the address on the request address bus means; and
   means, responsive to the comparing means, for inhibiting initiation of the unlocked memory write operation when the stored address is the same as the address currently on the request address bus means.

2. The apparatus of claim 1 further comprising means, connected to the control line means, for inhibiting the means for requesting a locked memory operation when the locked memory operation in progress signal from another requestor is present.

3. A digital data processing system including
a memory having a plurality of storage locations, each storage location having a unique address;
a plurality of requestors;
control line means connected to each of the requestors, and system address bus means, connected to the memory and to each of the requestors, each requestor comprising:
means for requesting an unlocked memory write operation;
means for requesting a locked memory operation;
request address bus means;
means, connected to the locked memory operation requesting means and to the control line means, for generating a signal indicating a locked memory operation is in progress,
means, connected to the control line means, for receiving the locked memory operation in progress signal from another requestor, address storage means;
means, responsive to the receipt of a locked memory operation in progress signal, for storing the address on the system address bus means in the address storage means,
means, connected to the address storage means and the request address bus means, for comparing a portion of the stored address to a like portion of the address on the request address bus means; and
means, responsive to the comparing means, for inhibiting initiation of the unlocked memory write operation when the portion of the stored address is the same as the portion of the address currently on the request address bus means.

4. The apparatus of claim 3 further comprising means, connected to the control line means, for inhibiting the means for requesting a locked memory operation when the locked memory operation in progress signal from another requestor is present.

5. In a data processing system having a memory, a plurality of memory requestors, each requestor having means for requesting memory operations, means for storing a memory address and means for comparing memory addresses; control signal means connected to the memory and to each of the requestors, and address bus means connected to the memory and to each of the requestors, a method of locking a single memory location comprising the steps of:
   (a) if an unlocked memory read operation is requested by one of the requestors, performing the read operation on the memory location identified by the requestor;
   (b) if a locked memory operation is requested, performing the further steps of:
      (i) generating a signal indicating that a locked memory operation is in progress;
      (ii) storing the address of the memory location which is the subject of the locked memory operation in the address storing means;
      (iii) performing the locked memory operation; and
      (iv) removing the signal indicating that a locked memory operation is in progress;
   (c) if an unlocked memory write operation is requested, performing the further steps of:
      (i) determining if a locked memory operation signal is present,
      (ii) if a locked memory operation signal is not present, performing the unlocked memory write operation;
      (iii) if a locked memory operation signal is present, performing the further steps of:
         (A) comparing the address of the memory location at which the unlocked memory operation is requested with the address stored in the address storing means;
         (B) if the addresses are different, performing the unlocked memory write operation,
         (C) if the addresses are the same, suspending the unlocked memory write operation;
   (d) repeating steps (a)–(c) at each request for a memory operation.

6. In a data processing system having a memory, a plurality of memory requestors, each requestor having means for requesting memory operations, means for storing a memory address and means for comparing memory addresses; control signal means connected to the memory and to each of the requestors, and address bus means connected to the memory and to each of the requestors, a method of locking a plurality of memory locations comprising the steps of:
   (a) if an unlocked memory read operation is requested by one of the requestors, performing the read operation on the memory location identified by the requestor;
   (b) if a locked memory operation is requested, performing the further steps of:
      (i) generating a signal indicating that a locked memory operation is in progress;
      (ii) storing the address of the memory location which is the subject of the locked memory operation in the address storing means;
      (iii) performing the locked memory operation; and
      (iv) removing the signal indicating that a locked memory operation is in progress;
   (c) if an unlocked memory write operation is requested, performing the further steps of:
      (i) determining if a locked memory operation signal is present,
      (ii) if a locked memory operation signal is not present, performing the unlocked memory write operation;
      (iii) if a locked memory operation signal is present, performing the further steps of:
         (A) comparing a portion of the address of the memory location at which the unlocked memory operation is requested with a like portion of the address stored in the address storing means;
         (B) if the compared portions of the addresses are different, performing the unlocked memory write operation,
         (C) if the compared portions of the addresses are the same, suspending the unlocked memory write operation;
   (d) repeating steps (a)–(c) at each request for a memory operation.

7. In a data processing system having a memory, a plurality of memory requestors, each requestor having means for requesting memory operations, means for storing a memory address and means for comparing memory addresses; control signal means connected to the memory and to each of the requestors, and address bus means connected to the memory and to each of the requestors, a method of locking a plurality of memory locations comprising the steps of:
  (a) if an unlocked memory read operation is requested by one of the requestors, performing the read operation on the memory location identified by the requestor;
  (b) if a locked memory operation is requested, performing the further steps of:
    (i) generating a signal indicating that a locked memory operation is in progress;
    (ii) storing a portion of the address of the memory location which is the subject of the locked memory operation in the address storing means;
    (iii) performing the locked memory operation; and
    (iv) removing the signal indicating that a locked memory operation is in progress;
  (c) if an unlocked memory write operation is requested, performing the further steps of:
    (i) determining if a locked memory operation signal is present,
    (ii) if a locked memory operation signal is not present, performing the unlocked memory write operation;
    (iii) if a locked memory operation signal is present, performing the further steps of:
      (A) comparing a like portion of the address of the memory location at which the unlocked memory operation is requested with the portion of the address stored in the address storing means;
      (B) if the compared portions of the addresses are different, performing the unlocked memory write operation,
      (C) if the compared portions of the addresses are the same, suspending the unlocked memory write operation;
  (d) repeating steps (a)-(c) at each request for a memory operation.

* * * * *